United States Patent
Oami et al.

(10) Patent No.: US 9,684,835 B2
(45) Date of Patent: Jun. 20, 2017

(54) IMAGE PROCESSING SYSTEM, IMAGE PROCESSING METHOD, AND PROGRAM

(71) Applicant: NEC Corporation, Tokyo (JP)

(72) Inventors: Ryoma Oami, Tokyo (JP); Masaru Aoki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/427,730

(22) PCT Filed: Jul. 31, 2013

(86) PCT No.: PCT/JP2013/070697
§ 371 (c)(1),
(2) Date: Mar. 12, 2015

(87) PCT Pub. No.: WO2014/041912
PCT Pub. Date: Mar. 20, 2014

(65) Prior Publication Data
US 2015/0248587 A1    Sep. 3, 2015

(30) Foreign Application Priority Data

Sep. 13, 2012    (JP) .................................. 2012-201942

(51) Int. Cl.
*G06K 9/00*    (2006.01)
*G06K 9/62*    (2006.01)
(Continued)

(52) U.S. Cl.
CPC ..... *G06K 9/00718* (2013.01); *G06K 9/00771* (2013.01); *G06K 9/6215* (2013.01);
(Continued)

(58) Field of Classification Search
USPC ....... 382/100, 103, 106–107, 123, 162, 168, 382/173, 181, 199, 203, 209, 218–219,
(Continued)

(56) References Cited

U.S. PATENT DOCUMENTS 8,224,029 B2 *    7/2012    Saptharishi ........ G06K 9/00771
                                            382/103
2004/0257444 A1 * 12/2004    Maruya ............ G08B 13/19645
                                            348/169
(Continued)

FOREIGN PATENT DOCUMENTS

| JP | 2005-12415 | 1/2005 |
| JP | 2008-219570 | 9/2008 |
| JP | 2011-227654 | 11/2011 |

OTHER PUBLICATIONS

International Search Report mailed Sep. 10, 2013 in corresponding PCT International Application.

*Primary Examiner* — Seyed Azarian
(74) *Attorney, Agent, or Firm* — Finnegan, Henderson, Farabow, Garrett & Dunner, L.L.P.

(57) ABSTRACT

An image processing system, an image processing method, and a program capable of suppressing errors related to association of a person appearing in a video are provided. An image processing system includes: an image acquiring unit which accepts input of videos captured by a plurality of video cameras; a next camera predicting unit which predicts a video camera on which an object detected in a video is to appear next; and a display control unit which announces a confusability of an object according to a similarity between the detected object and another object that is likely to appear in a video of the video camera predicted by the next camera predicting unit and which causes a display device to display a video from the video camera predicted by the next camera predicting unit.

15 Claims, 9 Drawing Sheets

(51) Int. Cl.
*H04N 7/18* (2006.01)
*G06T 7/292* (2017.01)
*H04N 5/225* (2006.01)

(52) U.S. Cl.
CPC ............... *G06T 7/292* (2017.01); *H04N 7/18* (2013.01); *H04N 7/181* (2013.01)

(58) Field of Classification Search
USPC ....... 382/224, 232, 254, 274, 276, 286–291, 382/305, 312; 348/169
See application file for complete search history.

(56) References Cited

U.S. PATENT DOCUMENTS

| | | | | |
|---|---|---|---|---|
| 2009/0060352 | A1* | 3/2009 | Distante | A63B 24/0021 382/224 |
| 2009/0245573 | A1* | 10/2009 | Saptharishi | G06K 9/00771 382/103 |
| 2010/0097475 | A1* | 4/2010 | Yokomitsu | H04N 7/181 348/169 |
| 2013/0039590 | A1* | 2/2013 | Yoshio | G06K 9/00288 382/218 |

\* cited by examiner

IMAGE PROCESSING SYSTEM, IMAGE PROCESSING METHOD, AND PROGRAM

CROSS-REFERENCE TO RELATED PATENT APPLICATIONS

This application is a National Stage Entry of International Application No. PCT/JP2013/070697, filed Jul. 31, 2013, which claims priority from Japanese Patent Application No. 2012-201942, filed Sep. 13, 2012. The entire contents of the above-referenced applications are expressly incorporated herein by reference.

BACKGROUND

Aspects of the present invention relate to an image processing system, an image processing method, and a program.

In recent years, systems for carrying out surveillance over a wide range using video images from a plurality of cameras are being considered. For example, Patent Publication JP-A-2008-219570 discloses a device that is capable of appropriately tracking (monitoring) a person across cameras using inter-camera coupling relation information. The device obtains a correspondence relationship of a person in accordance with a similarity in person's features between a point where the person appears in a camera view (In point) and a point where the person disappears from the camera view (Out point).

When a correspondence relationship of a person is automatically determined according to similarity as is the case of the device described in Patent Publication JP-A-2008-219570, errors occur with a fixed probability. In consideration thereof, there are demands for performing an association of a person with human involvement.

However, even if a human is involved, there are cases where an erroneous association is likely to occur. For example, when another person who is dressed the same way as a person who is a surveillance subject appears on a screen, a user who is a surveillant is likely to mistake the person as the person who is a surveillance subject.

SUMMARY

Some of the aspects of the present invention have been made in consideration of such problems, and an object of these aspects is to provide an image processing system, an image processing method, and a program capable of suppressing errors related to association of a person appearing in a video.

An image processing system according to the present invention comprises: input means for accepting input of videos captured by a plurality of video cameras; predicting means for predicting a video camera on which an object detected in the videos inputted from the input means is to appear next; and display control means for announcing a confusability of the object according to a similarity between the detected object and another object that is likely to appear in a video of the video camera predicted by the predicting means and also causing a display device to display a video from the video camera predicted by the predicting means.

An image processing method according to the present invention comprises the steps of: accepting input of videos captured by a plurality of video cameras; predicting a video camera on which an object detected in the inputted videos is to appear next; and announcing a confusability of the object according to a similarity between the detected object and another object that is likely to appear in a video of the predicted video camera and causing a display device to display a video from the predicted video camera.

A program according to the present invention causes a computer to execute the processes of: accepting input of videos captured by a plurality of video cameras; predicting a video camera on which an object detected in the inputted videos is to appear next; and announcing a confusability of the object according to a similarity between the detected object and another object that is likely to appear in a video of the predicted video camera and causing a display device to display a video from the predicted video camera.

Moreover, as used in the present invention, the terms "unit", "means", "device", and "system" not only signify physical means but also include cases where functions of the "unit", "means", "device", and "system" are realized by software. In addition, functions of one "unit", "means", "device", or "system" may be realized by two or more physical means or devices, and functions of two or more "units", "means", "devices", or "systems" may be realized by one physical means or device.

According to the present invention, an image processing system, an image processing method, and a program capable of suppressing errors related to association of a person appearing in a video can be provided.

EXEMPLARY EMBODIMENTS

Figure 1:
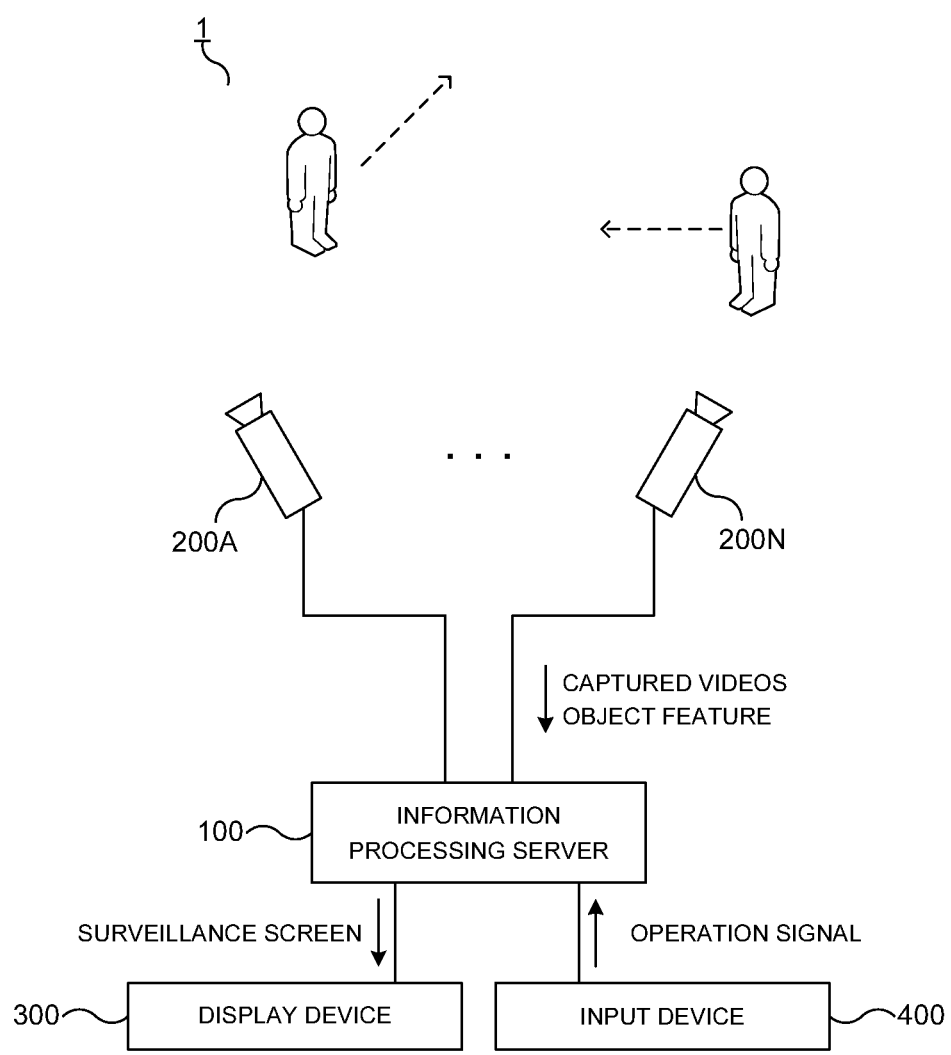
FIG. 1 is a functional block diagram showing a schematic configuration of a surveillance system according to a first embodiment.

Hereinafter, embodiments of the present invention will be described. In the following description and in the description of the referenced drawings, same or like components are represented by same or like reference characters.

1 First Embodiment

FIGS. 1 to 8 are diagrams for describing a first embodiment. Hereinafter, the present embodiment will be described in the order explained below with reference to these drawings. First, an outline of a system configuration is presented in "1.1", and an outline of the first embodiment as a whole is presented in "1.2" by showing a specific example of a display screen. Subsequently, a functional configuration of a system is described in "1.3", a flow of processes is presented in "1.4", and a specific example of a hardware configuration capable of realizing the present system is presented in "1.5". Finally, operational effects achieved by the present embodiment, modifications of the present embodiment, and the like are described in "1.6" and thereafter.

(1.1 System Configuration)

A system configuration of a surveillance system 1 that is an image processing system according to the present embodiment will now be described with reference to FIG. 1. FIG. 1 is a block diagram showing a system configuration of the surveillance system 1.

The surveillance system 1 is roughly constituted by an information processing server 100, a plurality of video cameras 200 (video cameras 200A to 200N will be collectively referred to as a video camera 200) for capturing videos, a display device 300, and an input device 400.

While the surveillance system 1 will be described hereinafter as a system for conducting surveillance on a person image-captured by the video camera 200, surveillance subjects are not limited thereto. For example, the surveillance subjects may be a moving object (an object or a mobile object) such as a vehicle or a motorcycle.

The video camera 200 captures a video, judges whether or not a person appears in the captured (image-captured) video, and transmits information related to the person such as a position and a feature to the information processing server 100 together with the captured video. In addition, the video camera 200 can perform tracking of a person appearing in a captured video.

Moreover, processes such as detection of a person, extraction of a feature, and tracking of a person inside a camera can be performed by, for example, the information processing server 100 or another information processing device (not shown).

The information processing server 100 performs various processes such as detection of a person, registration of a person to be tracked, and tracking of a registered person by analyzing a video captured by the video camera 200.

While a case where surveillance of a person is performed based on a real-time video captured by the video camera 200 will be mainly described below, the present embodiment is not limited to this case. For example, surveillance (analysis) may conceivably be performed on a video captured by the video camera 200 and subsequently stored in a storage device (for example, a hard disk device (HDD) or a video cassette recorder (VCR)). Furthermore, surveillance can conceivably be performed by replaying a video stored in the storage device in reverse (reverse replay). Normally, when a person engages in suspicious behavior, it is necessary to investigate what kind of actions the person had taken in the lead-up to the suspicious behavior. Accordingly, having surveillance means that uses such reverse replay is extremely useful.

In the surveillance of a person by the information processing server 100, the information processing server 100 outputs a screen for surveillance to the display device 300 and accepts operation signals for inputting various operations related to the surveillance of a person from the input device 400. More specifically, for example, the surveillance screen displayed on the display device 300 enables a user who is a surveillant to grasp a current location of a person by displaying a plurality of videos inputted from the video camera 200.

When viewing the display device 300, if a person who is a surveillance subject appearing in a video image (video) of a video camera 200 next appears in a video image of another video camera 200, the user who is a surveillant operates the input device 400 and associates the two persons with each other as a same person. Due to manually associating persons as described above, the present surveillance system 1 realizes association of persons with high accuracy.

The display device 300 is a display in which an image is displayed on, for example, a liquid crystal screen or an organic electro luminescence (EL) screen. A surveillance screen outputted from the information processing server 100 is displayed by the display device 300.

The input device 400 is a device used by a user (surveillant) for inputting various types of information. For example, a pointing device such as a mouse, a touch pad, or a touch panel, a keyboard, or the like corresponds to the input device 400. Various processes such as registration of a surveillance subject and association of a registered person with a person newly appearing on the video camera 200 (association as a same person) are carried out based on operations performed by the user on the input device 400.

Moreover, various configurations of the information processing server 100, the display device 300, and the input device 400 are conceivable. For example, the display device 300 and the input device 400 can conceivably be realized as a single client. Alternatively, the information processing server 100, the display device 300, and the input device 400 can conceivably be realized as a single information processing device. Furthermore, functions of the information processing server 100 may be realized by a plurality of information processing devices.

(1.2 Specific Example of Surveillance of a Person)

(1.2.1 Outline of Surveillance of a Person)

An outline of the surveillance of a person will now be described with reference to FIG. 2.

With the surveillance system 1 according to the present embodiment, as described above, when viewing the display device 300, if a person who is a surveillance subject (a person already registered as a surveillance subject) appearing in a video image of a video camera 200 next appears in another video camera 200, the input device 400 is operated to associate the two persons with each other as a same person. However, when a plurality of persons with similar appearances are present at the location of the surveillance subject, an error is likely to occur even if the association is to be performed by a human. Therefore, with the surveillance system 1 according to the present embodiment, when there is a person whose appearance is similar to that of the person who is a surveillance subject, the user is notified to that effect and alerted in order to suppress errors related to association.

Hereinafter, a specific example will be described in greater detail with reference to FIG. 2. The example shown in FIG. 2 assumes that, at time t, a surveillance screen on the display device 300 displays videos of two video cameras 200 respectively corresponding to "Camera 001" and "Camera 003" and respectively showing a person A and persons B and C. The person A, the person B, and the person C subsequently exit image-captured ranges (angles of view) of the respective video cameras 200 and, at time t+1, a person X and a person Y appear in a video camera 200 corresponding to "Camera 008".

At this point, it is assumed that the image-capture location of the "Camera 008" is a location which is to the right of the "Camera 001" and the "Camera 003" on a route where a person is predicted to next appear, and that the time of appearance is around time t+1.

Figure 2:
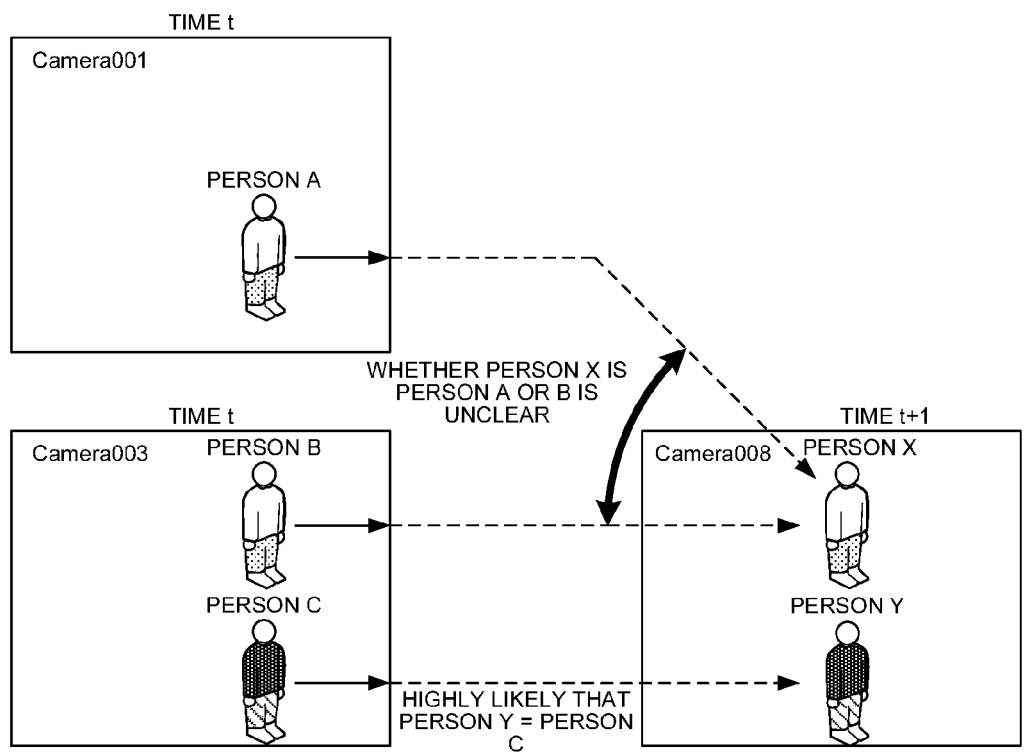
FIG. 2 is a diagram for explaining the surveillance system according to the first embodiment.

In the example shown in FIG. 2, the person X is similar in appearance to the person A and the person B (in other words, a feature of the person X is similar to those of the person A and the person B; this corresponds to a case where, for example, their clothes are similar in color), and the person Y is similar in appearance to the person C. In this case, regarding the person Y, since the person C is the only person with similar features, it is likely that the person Y and the person C are the same person and it is unlikely that the user who is a surveillant would make an erroneous association.

On the other hand, regarding the person X, since there are two persons (the person A and the person B) who have similar features, it is difficult for the user who is a surveillant to correctly determine which of the two persons the person X is associated with. This is because it is highly likely that the user is not aware of the fact that a plurality of persons may be associated with the person X. Therefore, with the surveillance system 1 according to the present embodiment, when there is a person whose appearance is similar to that of a surveillance subject, the user is notified to that effect and alerted in order to suppress association errors.

Hereinafter, a specific example of a display screen when issuing an alert is described with reference to FIGS. 3 to 5.

(1.2.2 Specific Example of Display Screen)

In the present embodiment, the information processing server 100 predicts which video camera 200 takes a video image in which the person who is the surveillance subject appears next and displays a video image of the video camera 200 on the display device 300.

In this case, video images of a plurality of video cameras 200 can be displayed on the surveillance screen of the display device 300. For example, video images from a plurality of video cameras 200 in which the person who is the surveillance subject is highly likely to appear next (for example, about four video cameras 200 may be selected in a descending order of likelihood of appearance) may conceivably be arranged on the same surveillance screen.

Figure 3:
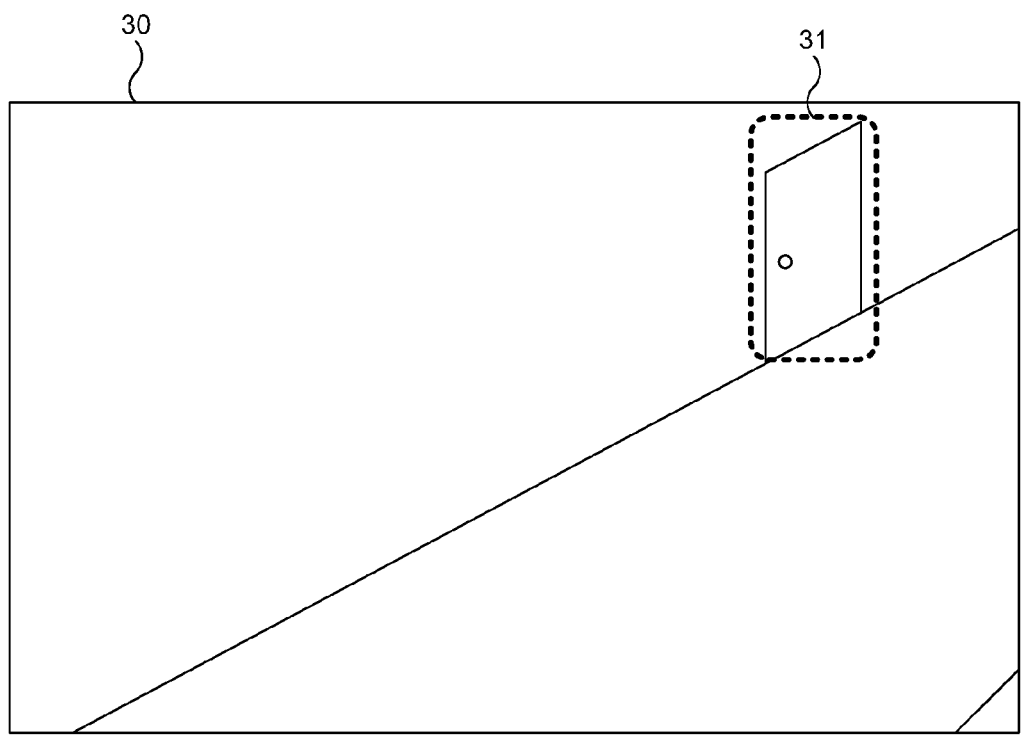
FIG. 3 is a diagram showing a specific example of a display screen.
Figure 4:
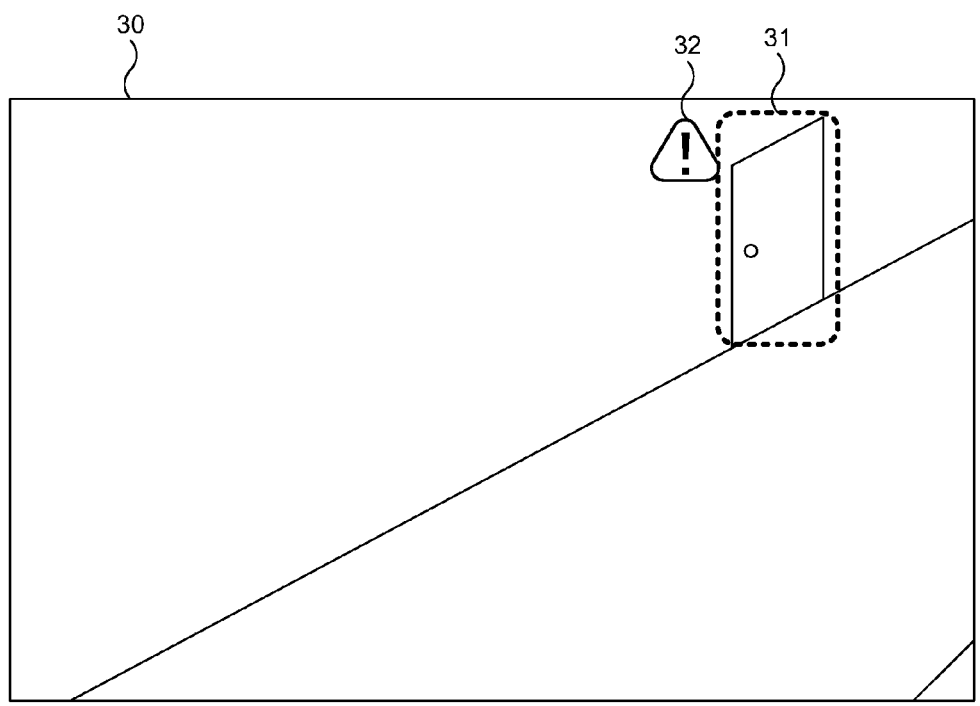
FIG. 4 is a diagram showing a specific example of a display screen.
Figure 5:
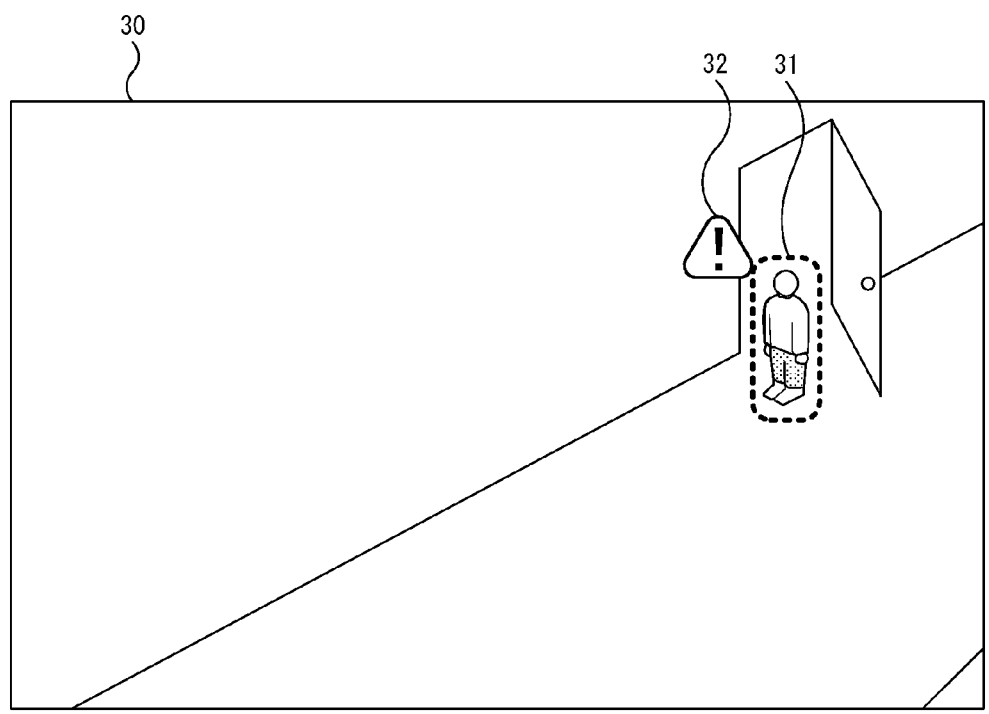
FIG. 5 is a diagram showing a specific example of a display screen.

FIGS. 3 to 5 are diagrams showing specific examples of a video display region 30 related to a video image of one video camera 200 among the surveillance screen displayed by the display device 300.

In the example shown in FIG. 3, an image 31 showing that the person who is the surveillance subject is highly likely to appear from the door captured in the image 31 in the near future is displayed superimposed on a video in the video display region 30.

FIG. 4 is a specific example of the video display region 30 displayed on the display device 300 when, in addition to the person who is the surveillance subject, a person who the user may confuse with the person who is the surveillance subject is also likely to appear from the same door. Unlike the case of FIG. 3, an image 32 that alerts the user is arranged in a vicinity of the image 31 showing that the person who is the surveillance subject is highly likely to appear.

In summary, when a person who is the surveillance subject is predicted to appear, the image 31 is displayed in the video display region 30. Furthermore, when it is highly likely that, in addition to the person who is the surveillance subject, a person who may be confused with the person who is the surveillance subject (a person with a similar appearance (for example, a person with a similar feature)) is to also appear around the time of appearance of the person who is the surveillance subject, the user is alerted to that effect by the display of the alerting image 32 and is prompted to take extra care when associating a person appearing in the video display region 30 with the person who is the surveillance subject.

FIG. 5 is a diagram showing a specific example when a person has appeared on the video image in the video display region 30. In the example shown in FIG. 5, the image 31 indicating that the appeared person is highly likely to be the person who is the surveillance subject and the image 32 indicating that the appeared person is highly likely to be a different person who may be confused with the person who is the surveillance subject are arranged around the appeared person.

In other words, the surveillance system 1 is configured so as to use the image 31 in order to indicate that the likelihood of the person who is the surveillance subject appearing (or the likelihood that a person is the person who is the surveillance subject) is high and to use the image 32 in order to notify the user that the person is highly likely to be a different person who the user may confuse with the person who is the surveillance subject. Such an implementation prompts the user with the image 31 to perform association in a reliable manner and suppresses erroneous associations with the image 32.

Moreover, a method of alerting the user, shapes of the images 31 and 32, and the like are not limited to those described above. For example, a location where the surveillance subject is likely to appear may be opaquely painted out and, when issuing an alert, a display method such as changing the color of the image 31 or causing the image 31 to blink (instead of displaying the image 32) can be used.

In addition, instead of presenting confusability upon the appearance of a person in the form of the image 32, the confusability may be presented in the form of message information such as "there is a plurality of persons similar to the person to appear next". In doing so, the presented text may be displayed as a non-scrolling text or a scrolling text. Various methods of presenting a text for issuing an alert can be used in addition to those described above.

Furthermore, a degree of confusability (a confusion rate which will be described later) may be numerically displayed or confusability may be presented using an indicator such as a bar whose length varies according to numerical magnitude.

Conceivably, various display (announcement) methods can also be used to display the image 32 such as causing the image 32 to blink or to vary in color over time in order to alert the user.

Furthermore, an alert may be issued (an announcement may be made) to the user by emitting an alerting sound together with the image 32. Various announcement methods for alerting the user can also be used to present the sound.

The image 31 indicating a location where the likelihood of the person who is the surveillance subject making an appearance is high can conceivably be colored differently according to the likelihood of appearance. In this case, for example, on the image 31 the video display region 30 of the video in which the surveillance subject is most likely to appear may be colored darkest, the video display region 30 of the next likely video may be colored brighter, and the video display region 30 of the video in which the surveillance subject is least likely to appear may be colored brightest. Moreover, instead of making distinctions by color, the image 31 can conceivably be presented so as to blink at blinking frequencies that vary according to likelihood.

In addition, when arranging a plurality of video display regions 30 on the surveillance screen, the video display regions 30 may be lined up in a descending order of likelihood of appearance of the person who is the surveillance subject.

As described above, if persons who are likely to appear at the same time (a close time that falls within a predetermined time range) include a person who is likely to be confused (a person with a high confusability) and a person who is unlikely to be confused (a person with a sufficiently low confusability (a person whose confusion rate, to be described later, is lower than a sufficiently low threshold)), the information processing server 100 according to the present embodiment presents the likelihood that confusion may occur as shown in FIG. 4 prior to the appearance of the person.

A case where a person appearing in a video image is a person who the user is unlikely to confuse with the person who is the surveillance subject (a person with a sufficiently low likelihood of the user confusing the person with the person who is the surveillance subject) is also conceivable. In this case, after judging the likelihood of confusion according to the feature and the like of the appeared person (in the method described later, after calculating a confusion rate, a judgment is made based on whether or not the confusion rate exceeds a threshold), the alerting image 32 shown in FIG. 5 is not displayed if there is no likelihood of confusion. Conversely, when there is a plurality of persons who the user is likely to confuse with the person who is the surveillance subject and the appeared person is a person who the user is likely to confuse with the person who is the surveillance subject, the user may be alerted in a stronger manner by highlighting the image 32 shown in FIG. 5 or the like. Details of calculation of a confusion rate indicating a likelihood of confusion will be described later.

(1.3 Functional Configuration of System)

Hereinafter, a functional configuration of the surveillance system 1 will be described with reference to FIG. 6. Moreover, respective functional configurations of the input device 400 and the like including registration and association of a person who is the surveillance subject by the user are not shown in FIG. 6.

Figure 6:
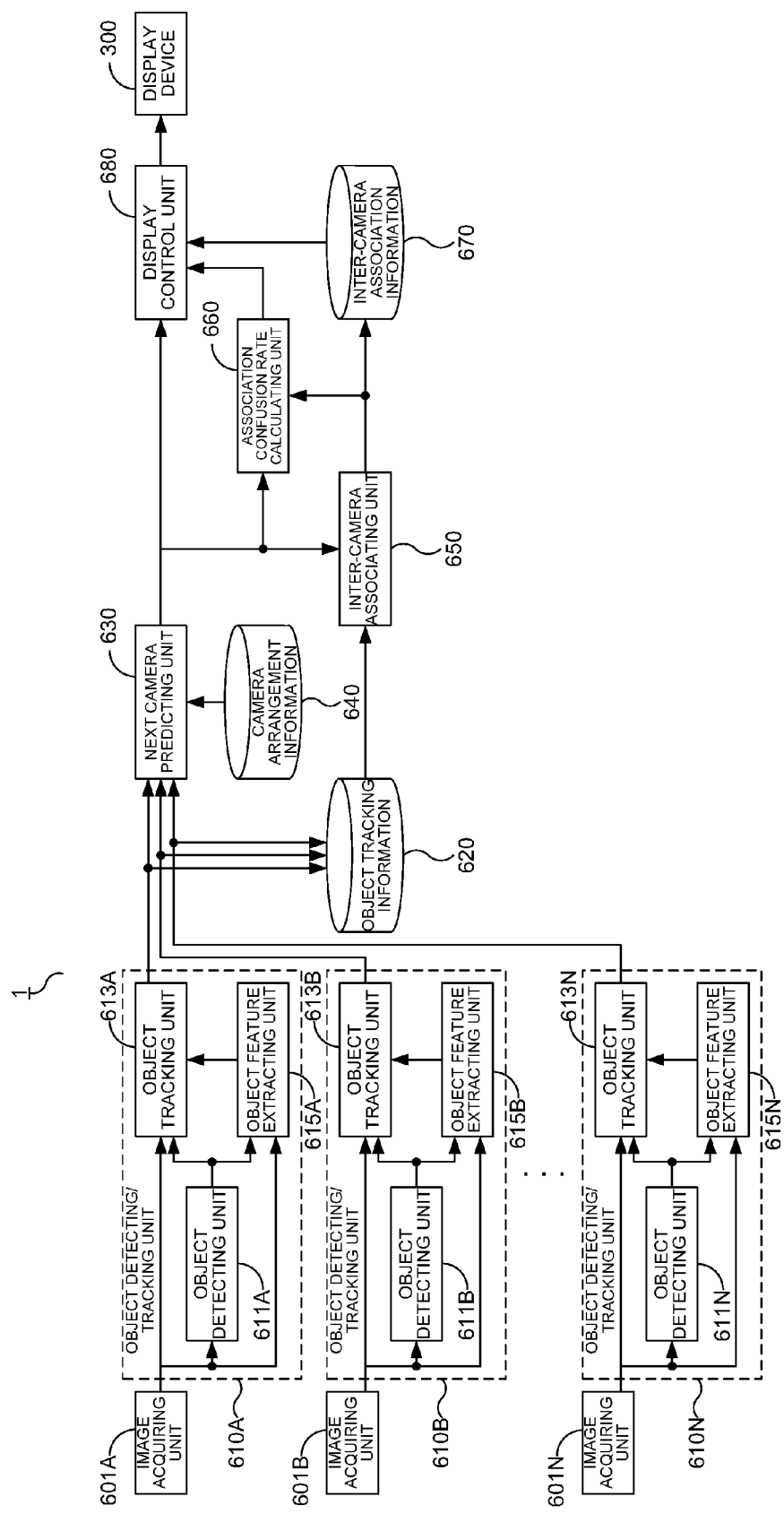
FIG. 6 is a functional block diagram showing a schematic functional configuration of the surveillance system according to the first embodiment.

As shown in FIG. 6, the surveillance system 1 comprises an image acquiring unit 601 (image acquiring units 601A to 601N will be collectively referred to as the image acquiring unit 601), an object detecting/tracking unit 610 (object detecting/tracking units 610A to 610N will be collectively referred to as the object detecting/tracking unit 610), an object tracking information DB 620, a next camera predicting unit 630, camera arrangement information 640, an inter-camera associating unit 650, an association confusion rate calculating unit 660, inter-camera association information 670, a display control unit 680, and the display device 300.

The image acquiring unit 601 acquires a captured video by having the video camera 200 image-capture an actual scene. Alternatively, after a video (video image) captured by the video camera 200 is recorded onto a storage device such as an HDD, the image acquiring unit 601 acquires an image by replaying the recorded video (video image) (in the case of a VCR, by capturing a replay analog signal).

In this case, replay refers to decoding encoded video data to generate data of an original picture (frame). However, displaying a generation result on a display screen does not constitute replay. In addition, a replay speed need not necessarily be an actual speed (an actual recording speed) and, if possible, replay (decoding) may be performed at a higher speed than an actual duration. Furthermore, instead of decoding all of the frames of a video image, replay may be performed by skipping frames. For example, when encoding has been performed by a system such as MPEG-2, while I, P, and B pictures exist in a video image, only I pictures or only I and P pictures may be decoded.

Moreover, cases where a video image recorded on a storage device is replayed can conceivably be divided into acquiring a video image by forward replay and acquiring a video image by reverse replay. Hereinafter, an example of a case where a video captured by the video camera 200 is processed in real-time will be mainly described.

The object detecting/tracking unit 610 comprises an object detecting unit 611 (object detecting units 611A to 611N will be collectively referred to as the object detecting unit 611), an object tracking unit 613 (object tracking units 613A to 613N will be collectively referred to as the object tracking unit 613), and an object feature extracting unit 615 (object feature extracting units 615A to 615N will be collectively referred to as the object feature extracting unit 615). The object detecting/tracking unit 610 uses the object detecting unit 611 to detect a person as an object from a video acquired by each of the image acquiring units 601, and uses the object feature extracting unit 615 to calculate a feature of the person from a person area detected by the object detecting unit 611. More specifically, for example, a person can be extracted by extracting a mobile object using a background differencing technique in which a difference between a background image prepared in advance and a frame image is obtained and subsequently applying a detector having learned features such as a shape of a person or a part thereof on the extracted mobile object area. In addition, as a feature of a person, features such as a color or a pattern of clothes worn by the person can be extracted in the form of a color histogram or an edge histogram.

Furthermore, by comparing images (frames) in a time series, the object tracking unit 613 tracks each person extracted as an object in a same angle of view (a same video image), and generates object tracking information (time-series data of a position and feature information of a person as an object) for each detected/tracked person. Conceivably, for example, tracking by a mean shift method or tracking using a particle filter may be used to track a person between frames. The object tracking unit 613 stores the generated object tracking information in the object tracking information DB (database) 620 and outputs the generated object tracking information to the next camera predicting unit 630.

The next camera predicting unit 630 predicts which of the image acquiring units 601 had acquired an image in which a person having moved outside the angle of view (moved outside the frame) of a video image is likely to next appear based on the object tracking information generated by the object tracking unit 613 and the camera arrangement information 640, and generates next camera prediction information that represents the prediction result. In this case, the camera arrangement information 640 is information describing a spatial positional relationship among a plurality of arranged cameras and, specifically, includes an adjacency relationship between cameras, a distance between cameras (or an average time required to move between cameras), or the like. An adjacency relationship is information representing whether or not cameras are adjacent to each other and, if so, how far and in what direction the cameras are positioned from one another. Information of the adjacency relationship is described in association with the angle of view of the camera. Accordingly, the next camera predicting unit 630 enables adjacent cameras to be selected according to a direction in which a person moves outside a frame.

The next camera prediction information generated by the next camera predicting unit 630 includes, for each image acquiring unit 601 (for each video camera 200), calculation results of a probability of appearance, a predicted appearance position in the angle of view, and a predicted appearance time of a person and a feature of the person, and is generated for each tracked person. For example, in a case where the person A appears in the camera 01 and moves outside the frame in the direction of the camera 02, when making a prediction using an average movement time between cameras, the probability of appearance can be calculated using a probability distribution having a highest peak at a time that is a sum of the time of moving outside the frame and the average movement time. In doing so, instead of using an average movement time, after predicting a time of arrival at the camera 02 by calculating a movement speed prior to exiting the frame from a tracking result of the camera 01, a probability distribution can be calculated based on the predicted time. In this case, while probability distributions of various shapes such as a Gaussian distribution can be used, when determining a probability distribution parameter, information related to a variation of arrival times from the camera 01 to the camera 02 is important. This information can be measured in advance and retained as data or acquired by learning from information regarding associations made by the user. In addition, when there are adjacent cameras other than the camera 02, a probability may be calculated by estimating a likelihood of the person moving in the direction of each adjacent camera and multiplying the probability of appearance by the calculated value. Results of measurements performed in advance can be used for this estimation.

The inter-camera associating unit 650 compares, for each person (object), a feature included in next camera prediction information and a feature of a person detected in a video image of the video camera 200 in which the person is likely to appear next, and when a distance between features is small (or when a similarity between features is high), the inter-camera associating unit 650 associates the persons with each other and stores the association information in the inter-camera association information DB 670 as inter-camera association information 670. Alternatively, when the user explicitly associates the persons between cameras, an association is determined based on this information.

The association confusion rate calculating unit 660 calculates a similarity between features of objects whose predicted appearance times are close to each other (for example, a difference between predicted appearance times falls within a certain period of time) from next camera prediction information of each person. More specifically, depending on whether or not a person with a high similarity to the person who is the surveillance subject (for example, a person whose similarity of feature exceeds a threshold) is detected in one camera and in another video camera 200, the association confusion rate calculating unit 660 calculates a degree of likelihood of making an erroneous association when the person who is the surveillance subject appears in a next camera as an association confusion rate. Alternatively, if a person who is likely to be associated has already appeared in the next camera when the inter-camera association information DB 670 is referenced, on the basis of the inter-camera association information 670 a similarity may be evaluated between the person and a plurality of persons associated with that person and an association confusion rate may be calculated based on a result of the similarity evaluation. For example, when similarities between the person who is the surveillance subject and a plurality of other persons are high, since there is a high likelihood that the user who is a surveillant is to be confused, the confusion rate may be set high. On the other hand, when similarities with other persons are low, since the likelihood that the user who is a surveillant is to be confused is low, the confusion rate may be set low.

More specifically, the association confusion rate can be calculated as described below. When there are N-number of persons whose predicted appearance time is within a predetermined time width from the predicted appearance time of the person who is the surveillance subject, similarities are calculated by comparing the features of the persons with the feature of the surveillance subject. For example, if a similarity between the person who is the surveillance subject and an i-th person is expressed as $S_i$ (i=1, . . . , N; where a similarity $S_i$ in the case of completely identical features is assumed to be 1), a function expressing a confusability at a similarity of x is a function F(x) (where F(x) is a monotonically non-decreasing function of x and takes a value between 0 and 1), then an association confusion rate can be calculated by the following equation.

$$\text{Association confusion rate} = \frac{\sum_{i=1}^{N} F(S_i)}{\sum_{i=1}^{N} F(S_i) + 1} \qquad \text{[Expression 1]}$$

For example, when features of the surveillance subject and an i-th person (where i=1, . . . , N) are completely identical, a confusion rate is a probability of selecting N-number of persons other than the surveillance subject from N+1-number of persons. The equation above is an expansion thereof.

In addition, for example, in a case where a corresponding person has already appeared in a next camera, if a similarity between the feature of the appeared person and the feature of the surveillance subject is expressed by S', then an association confusion rate can be calculated by the following equation.

$$\text{Association confusion rate} = \frac{\sum_{i=1}^{N} F(S_i)}{\sum_{i=1}^{N} F(S_i) + 1} F(S') \qquad \text{[Expression 2]}$$

Alternatively, an association confusion rate may be calculated by first calculating a similarity by comparing the feature of the appeared person and features of N-number of persons other than the surveillance subject and subsequently determining an association probability. More specifically, if a similarity of an i-th person is denoted by $S_i'$ and an association probability at a similarity of x is denoted by P(x), then an association confusion rate can be calculated by the following equation.

$$\text{Association confusion rate} = \frac{\sum_{i=1}^{N} P(S_i')}{\sum_{i=1}^{N} P(S_i') + P(S')} F(S') \qquad \text{[Expression 3]}$$

Based on next camera prediction information, an association confusion rate, and inter-camera association information 670 of each person, the display control unit 680 generates an image (specific examples thereof are images denoted as images 31 and 32 in FIGS. 3 and 4) indicating information to be presented to the user who is the surveillant (information including at which position in which camera image the tracking subject (the surveillance subject) is to appear, a degree of confusability upon appearance of the tracking subject (the surveillance subject), and the like). Subsequently, when a person that becomes a tracking subject candidate actually appears on a screen of the next camera, information showing that the person is an association candidate (a specific example thereof is the image denoted as image 31 in FIG. 5) as well as information for presenting a confusability thereof based on a confusion rate (a specific example thereof is the image denoted as image 32 in FIG. 5) are generated.

(1.4 Flow of Processes)

Figure 7:
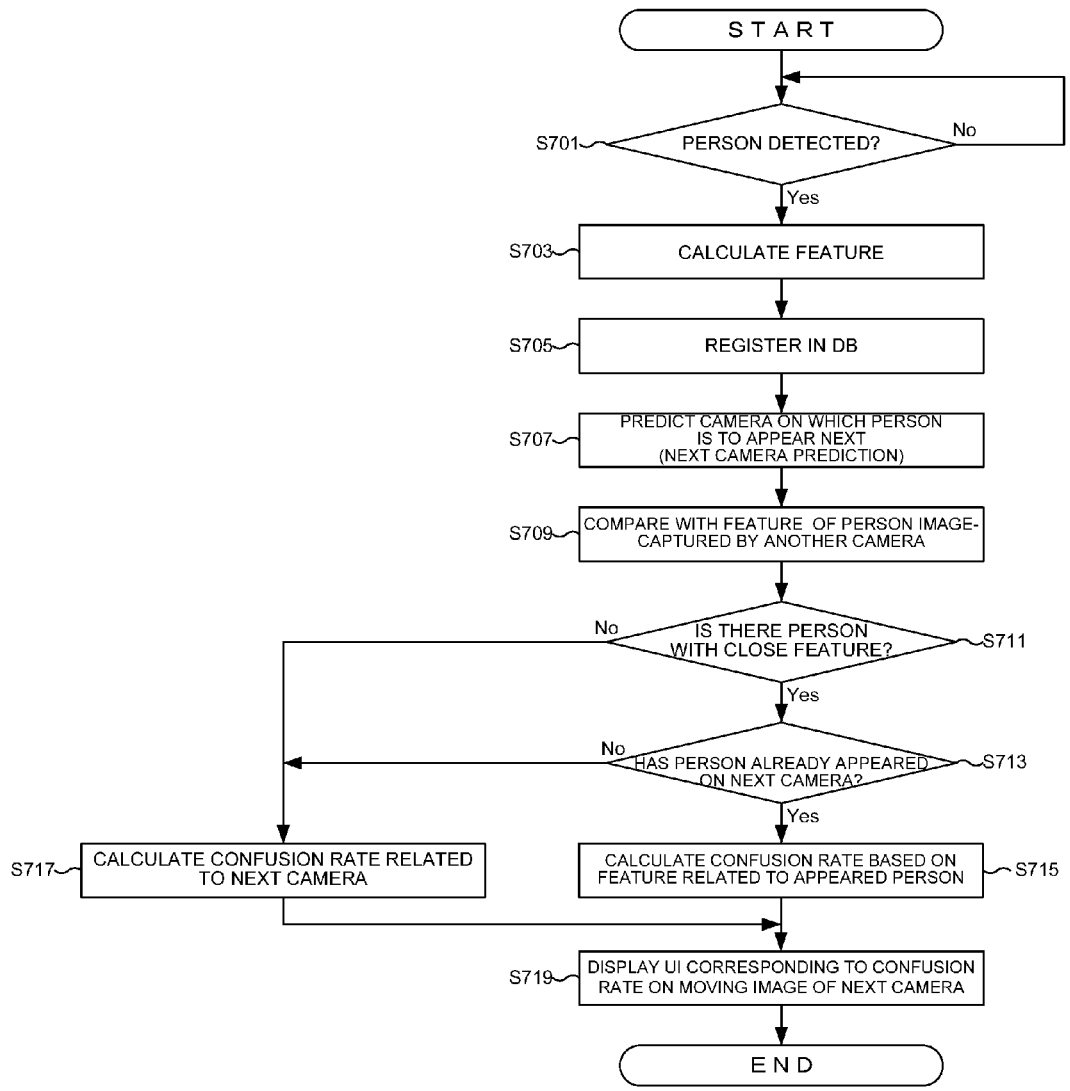
FIG. 7 is a flow chart showing a flow of processes of an information processing server shown in FIG. 1.

Next, processes performed by the surveillance system 1 will be described with reference to FIG. 7. FIG. 7 is a flow chart showing a flow of processes of the information processing server 100 according to the present embodiment.

It should be noted that, as long as no contradictions are created in contents of the processes, the respective process steps described below can be arbitrarily reordered or executed in parallel, or other steps may be added between the respective process steps. Furthermore, a step described as a single step for convenience' sake can be executed by dividing the step into a plurality of steps, and steps described divided into a plurality of steps for convenience' sake can be executed as a single step.

First, the object detecting unit 611 detects whether or not a person as a detection object has appeared in an image acquired by the image acquiring unit 601 (S701). As a result, when a person is detected (Yes in S701), the object feature extracting unit 615 calculates a feature of the person (S703). The object tracking unit 613 tracks the object between frames and, at the same time, registers a result of tracking within a same angle of view together with the calculated feature as object tracking information and registers the object tracking information in the object tracking information DB 620 (S705).

Next, based on the object tracking information received from the object tracking unit 613 and the camera arrangement information 640, the next camera predicting unit 630 predicts which of the image acquiring units 601 has taken a video image in which a person who is a surveillance subject and who had move outside the angle of view of a video image acquired by the image acquiring unit 601 is highly likely to appear next (S707).

In addition, the association confusion rate calculating unit 660 compares a feature of a person who is predicted by next camera prediction to appear in a next camera with a feature of a person who is predicted to appear in the next camera at a predicted appearance time that is close to that of the surveillance subject, and calculates a similarity between the features (S709). If there is a person with a small distance between features (a high similarity between features; moreover, these determinations can be made based on, for example, whether or not the distance or the similarity exceeds a threshold) (Yes in S711), the association confusion rate calculating unit 660 judges whether or not a person has already appeared in the predicted next camera (S713).

If a person who is likely to be associated has already appeared in the next camera (Yes in S713), using a result of association of persons between cameras associated with each other by the inter-camera associating unit 650, the association confusion rate calculating unit 660 calculates a confusion rate indicating a degree of confusability upon the appearance of a person who is the surveillance subject in the next camera predicted by the next camera predicting unit 630 (S715).

On the other hand, when there is no person with a close feature in S711 (No in S711) or a person has not yet appeared in the next camera (No in S713), a confusion rate is calculated based on a similarity resulting from a comparison of features with a person image-captured by another camera or the like using, for example, the Expression 1 (S717).

Moreover, as described earlier, the confusion rate is set high when it is highly likely that a plurality of persons with close features is to appear at the same or a close predicted appearance time and set low when there is no person with a close feature or there is no person who is predicted to appear at a close predicted appearance time.

The display control unit 680 indicates an appearance location of the person who is the surveillance subject on a video image of the next camera predicted by the next camera predicting unit 630 (for example, the image 31 shown in FIGS. 3 and 4) and, at the same time, when the confusion rate with respect to the person who is the surveillance subject is high, generates a display screen which alerts the user so as to avoid confusion (for example, the image 32 shown in FIG. 4), and causes the display device 300 to display the display screen (S719).

(1.5 Specific Example of Hardware Configuration)

Hereinafter, an example of a hardware configuration in a case where the afore-mentioned information processing server 100 is realized by a computer will be described with reference to FIG. 8. Moreover, as described earlier, the functions of the information processing server 100 can be realized by a plurality of information processing devices (for example, by a server and a client).

Figure 8:
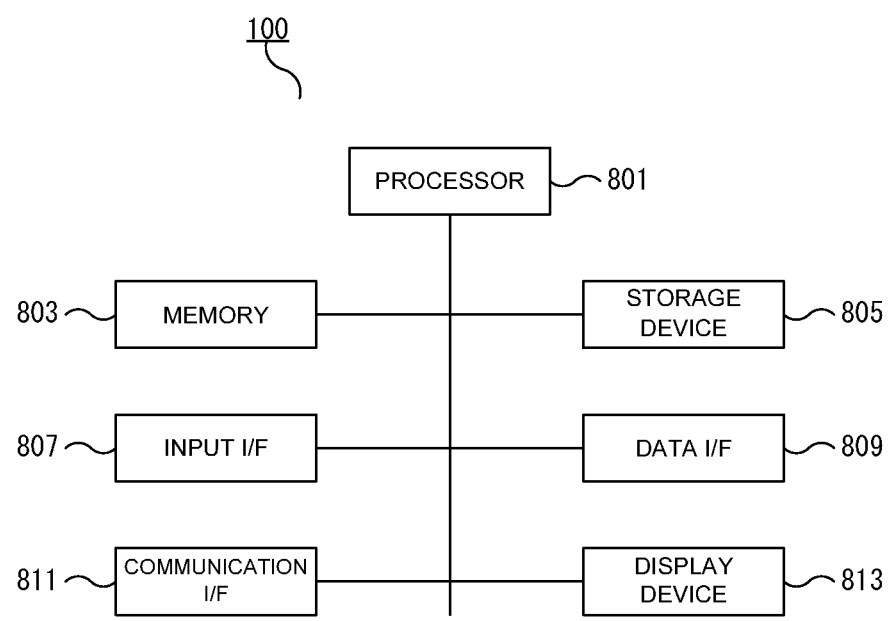
FIG. 8 is a block diagram showing a configuration of hardware capable of implementing the information processing server shown in FIG. 1.

As shown in FIG. 8, the information processing server 100 comprises a processor 801, a memory 803, a storage device 805, an input interface (I/F) 807, a data I/F 809, a communication I/F 811, and a display device 813.

The processor 801 controls various processes performed by the information processing server 100 by executing a program stored in the memory 803. For example, processes related to the next camera predicting unit 630, the inter-camera associating unit 650, the association confusion rate calculating unit 660, and the display control unit 680 described with reference to FIG. 6 can be realized as a program which is temporarily stored in the memory 803 and which mainly runs on the processor 801.

The memory 803 is a storage medium such as a random access memory (RAM). The memory 803 temporarily stores program codes of the program that is executed by the processor 801 and data necessary when executing the program. For example, a stack region that is required when executing the program is secured in a storage region of the memory 803.

The storage device 805 is a non-volatile storage medium such as an HDD, a flash memory, or a VCR. The storage device 805 stores an operating system, various programs for realizing the next camera predicting unit 630, the inter-camera associating unit 650, the association confusion rate calculating unit 660, and the display control unit 680, various data including the object tracking information DB 620, the camera arrangement information 640, and the inter-camera association information DB 670, and the like. Programs and data stored in the storage device 805 are referenced by the processor 801 by being loaded to the memory 803 as required.

The input I/F 807 is a device for accepting user input. The input device 400 described with reference to FIG. 1 can also be realized by the input I/F 807. Specific examples of the input I/F 807 include a keyboard, a mouse, a touch panel, and various sensors. The input I/F 807 may be connected to the information processing server 100 via an interface such as a universal serial bus (USB).

The data I/F 809 is a device for inputting data from outside the information processing server 100. Specific examples of the data I/F 809 include drive devices and the like for reading data stored in various storage media. The data I/F 809 may conceivably be provided outside the information processing server 100. In such a case, the data I/F 809 is connected to the information processing server 100 via an interface such as a USB.

The communication I/F 811 is a device for performing wired or wireless data communication with a device outside the information processing server 100 such as the video camera 200. The communication I/F 811 may conceivably be provided outside the information processing server 100. In such a case, the communication I/F 811 is connected to the information processing server 100 via an interface such as a USB.

The display device 813 is a device for displaying various types of information including the surveillance screen. In addition, the display device 300 described with reference to FIG. 1 can also be realized as the display device 813. Specific examples of the display device 813 conceivably include a liquid crystal display or an organic electro luminescence (EL) display. The display device 813 may be provided outside the information processing server 100. In such a case, the display device 813 is connected to the information processing server 100 via a display cable or the like.

(1.6 Operational Effects of the Present Embodiment)

As described above, when tracking a person (an object) who is a tracking subject (a surveillance subject), the surveillance system 1 according to the present embodiment presents a user with a video image/position in which the person who is the surveillance subject appears in an easily understood manner (for example, the image 31 of which specific examples are shown in FIGS. 3 to 5). Accordingly, the user who is a surveillant can readily associate the surveillance subject to a same person.

Furthermore, when there is another person (object) whose appearance is similar to that of the object who is the tracking subject, since it is likely that the user is to make an erroneous association, by showing the user that the likelihood of making an erroneous association is high (using, for example, the image 32 of which specific examples are shown in FIGS. 4 and 5), the user can be prevented from making an erroneous association. Such a method is particularly effective when it is predicted that a person who is the surveillance subject and a person similar in appearance to the person who is the surveillance subject are to appear at similar times.

(1.7 Modifications)

While cases where a video image acquired by the image acquiring unit 601 is mainly a real-time video image captured by the video camera 200 have been mainly described above, the present invention is not limited to such cases and a forward replay of a video image stored in a storage medium or a reverse replay of a video image stored in a storage medium may be used instead. Hereinafter, these cases will be briefly described.

(1.7.1 Processing a Recorded Video Image)

When the processing object is a video image stored in a storage medium, detection and tracking of an object (a person) need not necessarily be processed in real time and may instead be processed at a higher speed than a replay speed or processed before replaying the video image. When an object to become a tracking subject is specified, a judgment is made as to whether or not the object is to move outside the angle of view of a camera. When the object moves outside the angle of view, based on next camera prediction information calculated by the next camera predicting unit 630, the inter-camera associating unit 650 reads (retrieves) an object to become a candidate from the object tracking information DB 620, calculates a similarity between the objects, and determines an association candidate. At this point, if tracking information at a corresponding time has not been generated at the next camera prior to retrieval, the retrieval is to be performed after the tracking information is generated.

As a result of determining an association candidate, if an object to become a candidate is found by the next camera, the association confusion rate calculating unit 660 calculates an association confusion rate, and the display control unit 680 generates a screen of the candidate object, information indicating that the object is a candidate object (for example, the image 31 exemplified in FIGS. 3 to 5), and information presenting association confusability (for example, the image 32 exemplified in FIGS. 4 and 5) and causes the display device 300 to display the screen and the information.

The presentation of information can be performed in a descending order of likelihood that the objects are candidates according to degrees of consistency or similarity with a predicted time.

(1.7.2 Processing a Recorded Video Image by Reverse Replay)

The processing of a recorded video image described in "1.7.1" can also be applied to reverse replay. For example, when an object having engaged in suspicious behavior at a given point in time is a tracking subject, reverse replay is effective for pursing the lead-up to the suspicious behavior. Processing in the case of reverse replay is basically the same as that described in "1.7.1", with the exception that retrieval is performed in an opposite direction along a time axis. In other words, the time at which an object that is a tracking subject comes inside an angle of view of a camera is determined from tracking information, and when the object that is the tracking subject moves outside the angle of view, next camera prediction information is generated by next camera prediction by predicting in an opposite time direction.

2 Second Embodiment

Figure 9:
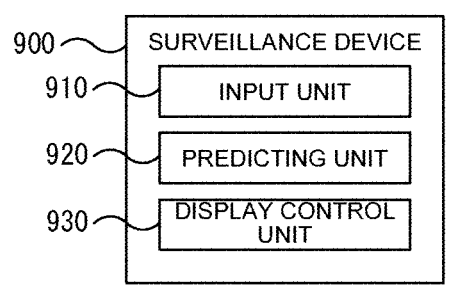
FIG. 9 is a functional block diagram showing a schematic configuration of a surveillance device according to a second embodiment.

Hereinafter, a second embodiment will be described with reference to FIG. 9. FIG. 9 is a block diagram showing a functional configuration of a surveillance device 900 that is an image processing system. As shown in FIG. 9, the surveillance device 900 comprises an input unit 910, a predicting unit 920, and a display control unit 930.

The input unit 910 accepts input of videos captured by a plurality of video cameras. The predicting unit 920 predicts a video camera on which an object detected in the videos inputted from the input means is to appear next. The display control unit 930 announces a confusability of the object to a user who is a surveillant according to a similarity between the object detected in the video and another object that is likely to appear in a video of the video camera predicted by the predicting unit 920. In addition, the display control unit 930 displays the video from the video camera predicted by the predicting unit 920 on a display device (not shown).

By adopting such an implementation, the surveillance device 900 according to the present embodiment enables errors related to association of a person appearing in a video to be suppressed.

3. Appendix

Moreover, the configurations of the embodiments described above may be combined with each other or a part of the components may be replaced. In addition, configurations of the present invention are not limited to the embodiments described and various modifications may be made without departing from the spirit and scope thereof.

A part of or all of the embodiments above may also be described as, but not limited to, the Supplementary notes provided below. In addition, the program according to the present invention need only be a program that causes a computer to execute the respective operations described in the embodiments above.

(Supplementary Note 1)

An image processing system comprising: input means for accepting input of videos captured by a plurality of video cameras; predicting means for predicting a video camera on which an object detected in the videos inputted from the input means is to appear next; and display control means for announcing a confusability of the object according to a similarity between the detected object and another object that is likely to appear in a video of the video camera predicted by the predicting means and also causing a display device to display a video from the video camera predicted by the predicting means.

(Supplementary Note 2)

The image processing system according to Supplementary note 1, wherein the display control means announces a confusability of an object according to a similarity between the detected object and another object that is likely to appear on the video camera predicted by the predicting means within a certain period of time from the time at which the detected object is predicted to appear on the video camera.

(Supplementary Note 3)

The image processing system according to Supplementary note 1 or 2, wherein the input means accepts input of the videos captured by a plurality of video cameras and stored in a storage device.

(Supplementary Note 4)

The image processing system according to Supplementary note 3, wherein the input means accepts input of the videos in a reverse order of an order of image-capturing.

(Supplementary Note 5)

The image processing system according to any one of Supplementary notes 1 to 4, wherein the display control means announces a confusability of an object by displaying an image in a vicinity of a position where the object is predicted to appear on a video of the video camera predicted by the predicting means.

(Supplementary Note 6)

An image processing method comprising the steps of: accepting input of videos captured by a plurality of video cameras; predicting a video camera on which an object detected in the inputted videos is to appear next; and announcing a confusability of the object according to a similarity between the detected object and another object that is likely to appear in a video of the predicted video camera and causing a display device to display a video from the predicted video camera.

(Supplementary Note 7)

The image processing method according to Supplementary note 6, wherein a confusability of an object is announced according to a similarity between the detected object and another object that is likely to appear on the predicted video camera within a certain period of time from the time at which the detected object is predicted to appear on the video camera.

(Supplementary Note 8)

The image processing method according to Supplementary note 6 or 7, wherein input of the videos captured by a plurality of video cameras and stored in a storage device is accepted.

(Supplementary Note 9)

The image processing method according to Supplementary note 8, wherein input of the videos is accepted in a reverse order of an order of image-capturing.

(Supplementary Note 10)

The image processing method according to any one of Supplementary notes 6 to 9, wherein a confusability of an object is announced by displaying an image in a vicinity of a position where the object is predicted to appear on a video of the predicted video camera.

(Supplementary Note 11)

A program causing a computer to execute the processes of: accepting input of videos captured by a plurality of video cameras; predicting a video camera on which an object detected in the inputted videos is to appear next; and announcing a confusability of the object according to a similarity between the detected object and another object that is likely to appear in a video of the predicted video camera and causing a display device to display a video from the predicted video camera.

(Supplementary Note 12)

The program according to Supplementary note 11, wherein a confusability of an object is announced according to a similarity between the detected object and another object that is likely to appear on the predicted video camera within a certain period of time from the time at which the detected object is predicted to appear on the video camera.

(Supplementary Note 13)

The program according to Supplementary note 11 or 12, wherein input of the videos captured by a plurality of video cameras and stored in a storage device is accepted.

(Supplementary Note 14)

The image processing method according to Supplementary note 13, wherein input of the videos is accepted in a reverse order of an order of image-capturing.

(Supplementary Note 15)

The program according to any one of Supplementary notes 11 to 14, wherein a confusability of an object is announced by displaying an image in a vicinity of a position where the object is predicted to appear on a video of the predicted video camera.

The present application claims priority on the basis of Japanese Patent Application No. 2012-201942 filed on Sep. 13, 2012, the entire contents of which are incorporated herein by reference.

We claim:

1. An image processing system comprising:
one or more storage devices storing instructions; and
one or more processors configured to execute the instructions to:
receive a plurality of videos respectively captured by a plurality of video cameras;
detect an object that appears in at least one of the plurality of videos;

predict a video camera that is likely to capture a video having the detected object next, based on an arrival time at which the detected object is predicted to appear in the video;

announce a confusability for the video which is captured by the predicted video camera and displays the detected object next, wherein the confusability is one or more of text, a message, one or more numbers, an indicator, or an alert, wherein the confusability indicates the detected object before the detected object appears in the video captured by the predicted video camera, and wherein the confusability shows a probability of similarity between the detected object and another object that is also likely to appear in the video; and cause a display device to display the video captured by the predicted video camera before the detected object appears on the video.

2. The image processing system according to claim 1, wherein the one or more processors are further configured to execute the instructions to announce the confusability based on whether the another object is likely to appear in the video within a certain period of time from which the detected object is predicted to appear in the video.

3. The image processing system according to claim 1, wherein the plurality of videos captured by the plurality of video cameras are stored in a storage device, and the one or more processors are further configured to execute the instructions to receive the plurality of videos from the storage device.

4. The image processing system according to claim 3, wherein the one or more processors are further configured to execute the instructions to receive the plurality of videos in a reverse order of an order in which the plurality of videos was captured by the plurality of video cameras.

5. The image processing system according to claim 1, wherein the one or more processors are further configured to execute the instructions to announce the confusability by displaying an image in a vicinity of a position where the detected object is predicted to appear in the video of the predicted video camera.

6. A computer-implemented method for processing images, the method comprising:

receiving, using one or more processors of an imaging processing system, a plurality of videos respectively captured by a plurality of video cameras;

detecting, using the one or more processors, an object that appears in at least one of the plurality of videos;

predicting, using the one or more processors, a video camera that is likely to capture a video having the detected object next, based on an arrival time at which the detected object is predicted to appear in the video;

announcing, using the one or more processors, a confusability for the video which is captured by the predicted video camera and displays the detected object next, wherein the confusability is one or more of text, a message, one or more numbers, an indicator, or an alert, wherein the confusability indicates the detected object before the detected object appears in the video captured by the predicted video camera, and wherein the confusability shows a probability of similarity between the detected object and another object that is also likely to appear in the video; and causing, using the one or more processors, a display device to display the video captured by the predicted video camera before the detected object appears on the video.

7. The computer-implemented method according to claim 6, further comprising:

announcing, using the one or more processors, the confusability of the detected object based on whether the another object is likely to appear in the video within a certain period of time from which the detected object is predicted to appear in the video.

8. The computer-implemented method according to claim 6, further comprising:

storing the plurality of videos captured by the plurality of video cameras in a storage device; and receiving, using the one or more processors, the videos from the storage device.

9. The computer-implemented method according to claim 8, further comprising:

receiving, using the one or more processors, the plurality of videos in a reverse order of an order in which the plurality of videos was captured by the plurality of video cameras.

10. The computer-implemented according to claim 6, further comprising:

announcing, using the one or more processors, the confusability by displaying an image in a vicinity of a position where the detected object is predicted to appear in the video of the predicted video camera.

11. A non-transitory computer-readable storage medium having a set of instructions that when executed on at least one processor, cause the at least one processor to perform a method, the method comprising:

receiving a plurality of videos respectively captured by a plurality of video cameras;

detecting an object that appears in at least one of the plurality of videos;

predicting a video camera that is likely to capture a video having the detected object next, based on an arrival time at which the detected object is predicted to appear in the video;

announcing, using the one or more processors, a confusability for the video which is captured by the predicted video camera and displays the detected object next, wherein the confusability is one or more of text, a message, one or more numbers, an indicator, or an alert, wherein the confusability indicates the detected object before the detected object appears in the video captured by the predicted video camera, and wherein the confusability shows a probability of similarity between the detected object and another object that is also likely to appear in the video; and causing a display device to display the video captured by the predicted video camera before the detected object appears on the video.

12. The non-transitory computer-readable storage medium according to claim 11, the method further comprising:

announcing the confusability based on whether the another object is likely to appear in the video within a certain period of time from which the detected object is predicted to appear in the video.

13. The non-transitory computer-readable storage medium according to claim 11, the method further comprising:

storing the plurality of videos captured by the plurality of video cameras in a storage device; and receiving the plurality of videos from the storage device.

14. The non-transitory computer-readable storage medium according to claim 13, the method further comprising:

receiving the plurality of videos in a reverse order of an order in which the plurality of videos was captured by the plurality of video cameras.

15. The non-transitory computer-readable storage medium according to claim 11, the method further comprising:

announcing the confusability by displaying an image in a vicinity of a position where the detected object is predicted to appear in the video of the predicted video camera.

* * * * *